United States Patent [19]
McInerney et al.

[11] 3,811,741
[45] May 21, 1974

[54] BEARING

[75] Inventors: Charles E. McInerney, Torrance; Olgierd S. Winiarz, Granada Hills, both of Calif.

[73] Assignee: The Garrett Corporation, Los Angeles, Calif.

[22] Filed: Dec. 26, 1972

[21] Appl. No.: 318,000

[52] U.S. Cl. .............................................. 308/122
[51] Int. Cl. ............................................ F16c 33/66
[58] Field of Search ........................... 308/121, 122

[56] References Cited
UNITED STATES PATENTS

| | | | |
|---|---|---|---|
| 763,409 | 6/1904 | Lind | 308/4 |
| 3,043,636 | 7/1962 | MacInnes et al. | 308/121 |
| 3,056,634 | 10/1962 | Woollenweber, Jr. et al. | 308/121 |

*Primary Examiner*—Charles J. Myhre
*Assistant Examiner*—Frank Susko
*Attorney, Agent, or Firm*—Albert J. Miller

[57] ABSTRACT

A bearing having a substantially free floating bushing prevented from rotation but without radial restraints.

4 Claims, 3 Drawing Figures

3,811,741

BEARING

BACKGROUND OF THE INVENTION

In high speed machinery, such as turbine driven compressors, it has been conventional to provide antifriction bearings to permit high speed shaft rotation up to 150,000 revolutions per minute. In many applications the bearing structure must be adaptable to mass production methods and be economical to manufacture. In addition, such bearing structure must have relatively long life and not be subject to break down. While antifriction bearings are available for high speed machinery rotating at such high speed shaft rotations, these bearings have been excessively expensive and their operating life far too short for economical operation.

Sleeve bearings have been proposed for this type of high speed machinery but single oil film sleeve bearings have not been capable of damping resonant vibrations. While double oil film sleeve bearings have an outer oil film to act as a damper of resonant vibrations, this type of bearing suffers from a whirl phenomenon under certain operating conditions.

In an internal combustion engine equipped with a turbine driven compressor for the purpose of increasing the power output of the engine by increasing the quantity of air fed to its combustion chamber, rotational speed of the air compressor has sometimes been limited by bearing whirl phenomenon. This phenomenon, known as "oil film whirl," "shaft whipping" or "half frequency whirl" generally occurs at speeds in excess of 2X value of the first or second critical speed of the rotor. These phenomenon in the journal bearings cause the shaft to whip or whirl as well as rotating about a stationary center line. The shaft whirls in such a manner that its center travels through a circular or modified circular path. While bearing clearances may limit such whirl motion, excessive shaft motion will result and the load carrying capacity of the bearings will decrease. If the whirl frequency happens to be one half that of shaft rotational frequency, a complete loss of bearing load carrying capacity can occur causing metal to metal contact resultant in rapid deterioration and destruction of the bearing system.

Further, when these clearances have been reduced to provide relatively small distances between the bearing and the journal to limit whirl, conventional sleeve bearings have not been found to operate satisfactorily.

SUMMARY OF THE INVENTION

In the present invention, a free floating sleeve or bushing is mounted within a bearing housing and a shaft mounted within the bushing. Substantial clearance is provided between the shaft and the bushing and between the bushing and the journal box or boxes of the bearing housing. A source of lubricant is provided under pressure for creating a film of lubricant between the bushing or journal box or boxes and a film of lubricant between the bushing and the shaft. The bushing is free floating and radially unrestrained but means are provided to prevent its rotation.

DESCRIPTION OF THE PREFERRED EMBODIMENTS

Figure 1:
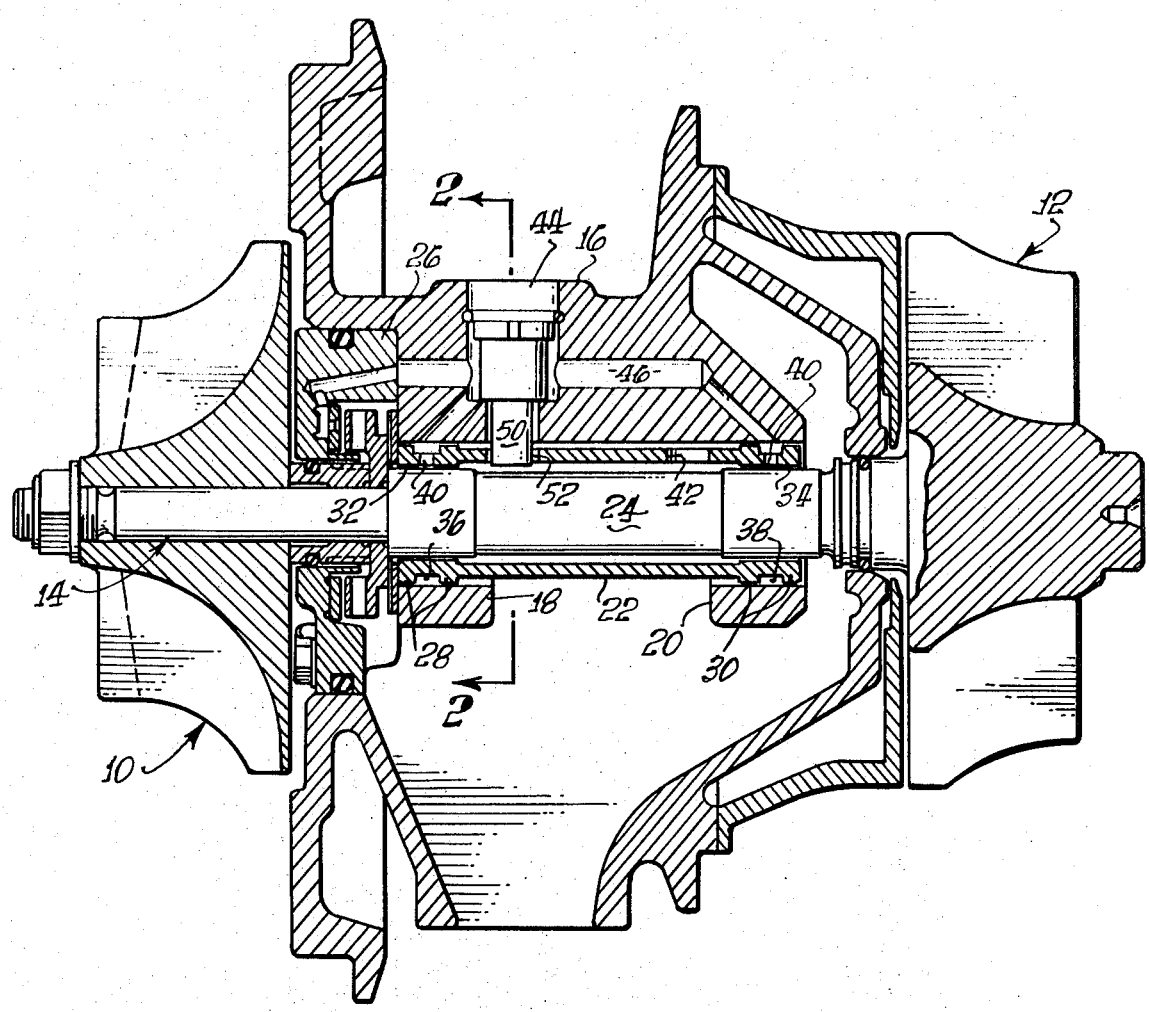
FIG. 1 is a sectional view of the bearing system of the present invention.
Figure 2:
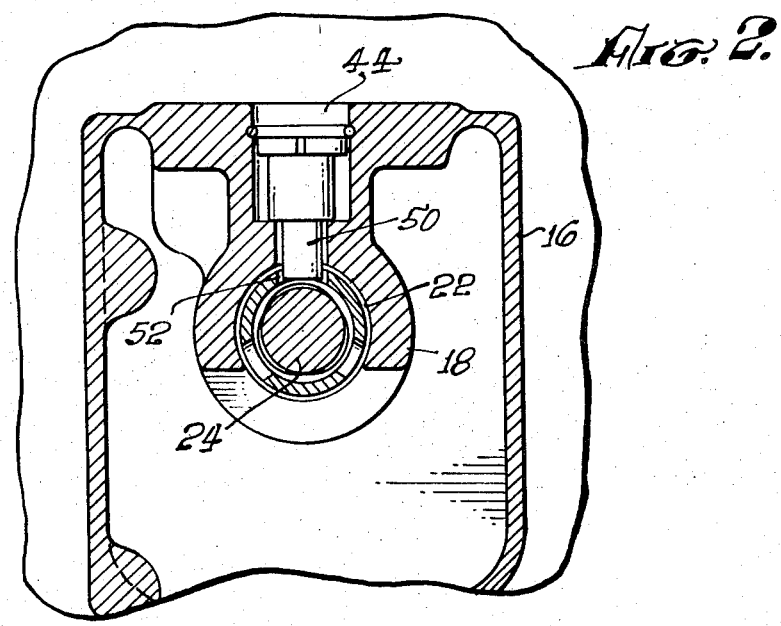
FIG. 2 is a sectional view taken along line 2—2 of FIG. 1.
Figure 3:
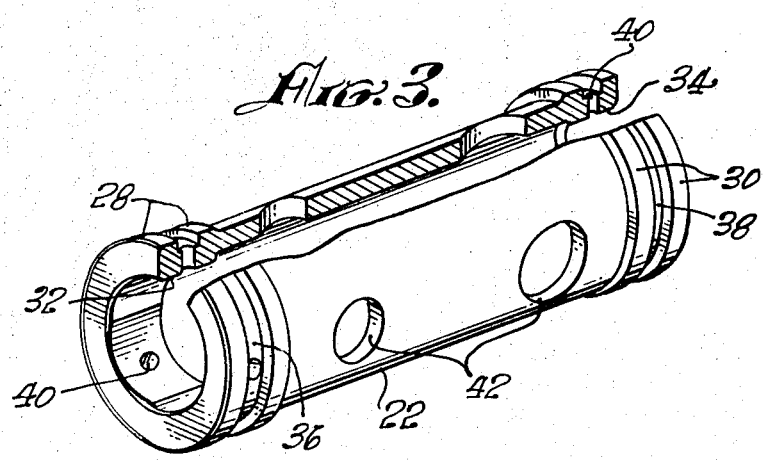
FIG. 3 is an isometric view of the bearing sleeve or bushing of FIGS. 1 and 2.

As shown in FIGS. 1 and 2, the invention can be incorporated as part of a turbine driven high speed compressor, although it may also be easily applied to many other forms of high speed rotating machinery. A compressor impeller or wheel assembly 10 and turbine wheel assembly 12 are mounted on opposite ends of a shaft 14 which extends through a central opening in a bearing housing assembly 16. Integral with the housing 16 are journal boxes 18 and 20 within which is located a bearing sleeve or bushing 22 which extends around the journal portion 24 of the shaft 14. Thrust plate and seal assembly 26 is provided between the impeller 10 and journal box 18.

The bearing sleeve or bushing 22 extends between journal boxes 18 and 20 and includes outward extending bosses 28 and 30 and inward extending bosses 32 and 34 in the area of the journal boxes 18 and 20 respectively. Circumferential oil distribution grooves are provided in bosses 28 and 30. A plurality of radially extending holes 40 are provided completely through the bosses 28, 32 and 30, 34. In addition, a plurality of larger openings 42 are provided in the central area of the bushing 22.

The bearing housing 16 is provided with an oil inlet 44 and oil supply lines 46 which provide lubricant to the grooves 36 and 38 and to the central area between the bushing 22 and the central opening in the bearing housing 16.

Substantial clearance is provided between the bosses 28 and 30 and the journal boxes 18 and 20 respectively. Likewise clearance is provided between the inner bosses 32 and 34 and the journal portion 24 of the shaft 14. The radial clearances between the bosses 28 and 30 and journal boxes 18 and 20 respectively should be at least twice the radial clearance between the bosses 32 and 34 and the journal portion 24 of the shaft 14. Thus the bushing 22 is free floating in the sense that it is not restrained in the radial direction in view of the clearances referred to above. The bushing will float in the oil films provided in the clearance between the bosses and the journal boxes and journal portion of the shaft.

It has been found, however, that free floating of the bushing 22 even insofar as it may be restrained by lubricant drag results in unsatisfactory bearing operation. A bearing retention pin 50 extending from the oil inlet 44 into a radial opening 52 in the bushing 22 will prevent rotation of the bushing while still allowing unrestrained radial movement thereof.

The bearing of the present invention will substantially reduce and in many cases completely eliminate shaft motion caused by whirl phenomenon. This will permit the attaining of higher rotational speeds than would have been possible with conventional rotating bearings. In addition, the aerodynamic running clearances can be decreased which will improve the efficiency of the rotating machine. The anti-rotation pin will constantly be immersed in oil when the machine is running, thus preventing metal to metal contact between the pin and the bearing.

While specific embodiments of the invention have been illustrated and described, it is to be understood that these embodiments are provided by way of example only and that the invention is not to be construed as being limited thereto, but only by the proper scope of the following claims.

What we claim is:

1. A bearing assembly comprising:
   a rotatable shaft;
   a bearing support housing having an opening to receive the rotatable shaft, said housing including two journal boxes axially spaced apart in the opening thereof;
   a substantially free-floating bearing sleeve disposed within the opening of said bearing support housing around said rotatable shaft, said bearing sleeve having radially inwardly and outwardly extending bosses at each end thereof, one end journalled in one of said journal boxes and the other end journalled in the other of said journal boxes so that said sleeve is substantially radially unrestrained between said journal boxes and said shaft;
   means to provide a fluid film between the radially outwardly extending bosses and said journal boxes and between the radially inwardly extending bosses and said rotatable shaft during rotation of said shaft, said means including a substantially radially extending fluid inlet in said bearing support housing extending from the exterior of said housing to the shaft receiving opening; and
   means operably associated with said bearing support housing and said sleeve to prevent relative rotation therebetween, said sleeve including a radially extending opening aligned with the radially extending fluid inlet in said housing and said rotation prevention means including a radially extending retention pin disposed in the radially extending fluid inlet and extending into the radially extending opening in said sleeve.

2. The bearing assembly of claim 1 wherein the radial clearance between the radially outwardly extending bosses and said journal boxes is at least twice the radial clearance between the radially inwardly extending bosses and said shaft.

3. The bearing assembly of claim 1 wherein each of said radially outwardly extending bosses includes a circumferentially extending groove and at least one opening extending from said groove to the interior of said sleeve.

4. The bearing assembly of claim 3 wherein said fluid film providing means includes means operably associated with said fluid inlet to provide fluid to the circumferentially extending grooves.

* * * * *